Patented Sept. 17, 1935

2,014,866

UNITED STATES PATENT OFFICE 2,014,866

BARBITURIC ACID COMPOUNDS OF 1-PHE-NYL-2,3-DIMETHYL-4-ISOPROPYL-5-PY-RAZOLONE

Otto Schnider, Basel, Switzerland, assignor to Hoffmann-La Roche Inc., Nutley, N. J., a corporation of New Jersey No Drawing. Application December 6, 1934, Serial No. 756,330. In Germany January 8, 1934

2 Claims. (Cl. 260—33)

It is known that 1-phenyl-2,3-dimethyl-5-pyrazolone and also 1-phenyl-2,3-dimethyl-4-dimethylamino-5-pyrazolone form compounds with dialkyl- and arylalkyl-barbituric acids (German Patent No. 479,669 and United States Patents Nos. 1,494,127 and 1,798,556). Corresponding compounds with 4-alkyl-pyrazolones have so far not yet been obtained.

It has now been found that 1-phenyl-2,3-dimethyl-4-isopropyl-5-pyrazolone does not behave in the same manner as 1-phenyl-2,3-dimethyl-5-pyrazolone and 1-phenyl-2,3-dimethyl-4-dimethylamino-5-pyrazolone. It forms compounds exclusively with barbituric acids possessing only saturated or at most only one unsaturated substituent. If both substituents are unsaturated, no compounds can be obtained.

The new compounds have the general formula

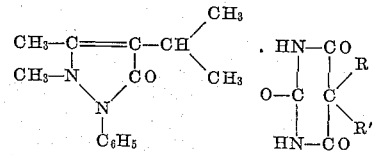

(R being a saturated or unsaturated alkyl, R' an aryl or a saturated alkyl group). They are very easily prepared in view of the great facility with which the components unite. 1-phenyl-2,3-dimethyl-4-isopropyl-5-pyrazolone is melted together with an equimolecular quantity of a dialkyl- or arylalkyl-barbituric acid or the starting materials are allowed to react together in the presence of a solvent or a diluent. The combination of 1-phenyl-2,3-dimethyl-4-isopropyl-5-pyrazolone and the dialkyl- or arylalkyl-barbituric acids always takes place in equimolecular proportions, even if larger quantities, for instance 2 molecules, of the one or the other component are present.

The new and very stable compounds are obtained in well-shaped crystals; by treatment with a solvent they cannot be split into their components. They are easily soluble in organic solvents, difficultly soluble in water. The new compounds are to be used as medicines, as they possess analgesic and antipyretic and likewise soporific properties. In these compounds the antipyretic and analgesic action of the pyrazolone component is considerably stronger, whereas the soporific action of the dialkyl- and arylalkyl-barbituric acids remains almost unaltered.

Example 1

105 parts by weight of isopropyl-allyl-barbituric acid are dissolved while heating in 600 parts by weight of benzene and 115 parts by weight of 1-phenyl-2,3-dimethyl-4-isopropyl-5-pyrazolone in 200 parts by weight of benzene, the solutions are united while still warm, and petroleum ether is added until a turbidity begins to appear. On cooling 200 parts by weight of the new compound are precipitated in fine colorless needles melting at 128° C. Neither the melting point nor the aspect of the compound are changed by recrystallization from dilute alcohol or dilute acetone. The remainder of the compound may be obtained by evaporating the mother liquor.

Example 2

To a warm solution of 232 parts by weight of C,C-phenyl-ethyl-barbituric acid in 700 parts by weight of acetone a solution of 230 parts by weight of 1-phenyl-2,3-dimethyl-4-isopropyl-5-pyrazolone in 300 parts by weight of acetone is added. On cooling the new compound is precipitated in fine needles melting at 161° C. They are easily soluble in organic solvents, difficultly soluble in water. The first crystallization yields about 400 parts by weight. The remainder may be precipitated from the mother liquor by the addition of water.

Example 3

290 parts by weight of C,C-β-bromo-allyl-isopropyl-barbituric acid are dissolved in 900 parts by weight of 90% alcohol. A solution of 230 parts by weight of 1-phenyl-2,3-dimethyl-4-isopropyl-5-pyrazolone in 500 parts by weight of 90% alcohol is prepared and the solutions are united while warm. From the clear colorless mixture 480 parts by weight of the new compound are precipitated while cooling. The colorless needles melt at 134–135° C. By adding a little water to the mother liquor a further 30 parts by weight may be obtained which, on being recrystallized from dilute alcohol, likewise show a melting point of 134–135° C.

Example 4

105 parts by weight of isopropyl-allyl-barbituric acid are well ground together with 115 parts by weight of 1-phenyl-2,3-dimethyl-4-isopropyl-5-pyrazolone. The mixture melts indefinitely at 92–100° C. It is suspended in 4000 parts by weight of water and stirred at 50–55° C. After 2 hours the compound shows a sharp melting point of 127° C. After recrystallization from dilute alcohol the melting point rises to 128° C.

Example 5

230 parts by weight of 1-phenyl-2,3-dimethyl-4-isopropyl-5-pyrazolone are dissolved in 600 parts by weight of 50% methanol while heating. A warm solution of 184 parts by weight of diethyl-barbituric acid in 1400 parts by weight of 50% methanol is added. On cooling 360 parts by weight of the new compound are precipitated in crystals melting at 138–139° C. The remainder is obtained from the mother liquor by precipitating with water.

Example 6

210 parts by weight of isopropyl-allyl-barbituric acid are well mixed with 230 parts by weight of 1-phenyl-2,3-dimethyl-4-isopropyl-5-pyrazolone. The mixture is slightly warmed in an open receptacle on the oil-bath while stirring. When the temperature of the oil has risen to 130° C., the mixture slowly begins to melt. At a temperature of 150° C. in the oil-bath the reaction product represents a clear almost colorless molten mass. It is cooled and soon congeals. The almost colorless compound thus obtained may be easily pulverized. It melts at 126–128° C. By recrystallization from dilute alcohol the melting point rises to 128° C. The compound, which crystallizes in needles, is colorless.

I claim:

1. The compounds of the general formula

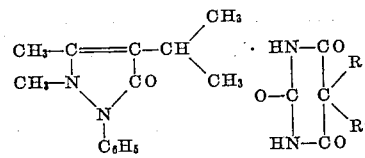

wherein R represents a saturated or an unsaturated alkyl, R' an aryl of the benzene series or a saturated alkyl group, the new compounds being very stable and forming well-shaped crystals, easily soluble in organic solvents, difficultly soluble in water, and possessing analgesic, antipyretic and soporific properties.

2. The compound of 1-phenyl-2,3-dimethyl-4-isopropyl-5-pyrazolone with isopropyl-allyl-barbituric acid, crystallizing in fine colorless needles melting at 128° C., being easily soluble in organic solvents, difficultly soluble in water and possessing analgesic, antipyretic and soporific properties.

OTTO SCHNIDER.